Sept. 27, 1932.   H. S. DAVIS   1,879,660
TERTIARY DERIVATIVE OF HYDROCARBONS AND PREPARATION THEREOF
Original Filed July 13, 1925   2 Sheets-Sheet 1

Inventor
Harold S. Davis
by Roberts, Cushman & Woodberry
his Att'ys

Patented Sept. 27, 1932

1,879,660

UNITED STATES PATENT OFFICE

HAROLD S. DAVIS, OF BELMONT, MASSACHUSETTS, ASSIGNOR, BY MESNE ASSIGNMENTS, TO PETROLEUM CHEMICAL CORPORATION, OF NEW YORK, N. Y., A CORPORATION OF DELAWARE

TERTIARY DERIVATIVE OF HYDROCARBONS AND PREPARATION THEREOF

Original application filed July 13, 1925, Serial No. 43,208. Divided and this application filed February 24, 1927. Serial No. 170,632.

This invention relates to the preparation of alcohols, particularly tertiary alcohols of olefine hydrocarbons, from the results of heat treatment of such source materials as petroleum, peat, coal, oil shales and like organic substances, and to the products of this process. The process of this invention is applicable to the treatment of mixed olefine-bearing hydrocarbons resulting from as complete generation by heat treatment of olefine hydrocarbons as possible, and is particularly suitable to the treatment of mixtures in which occur the very highly reactive or highly cracked hydrocarbons such as the diolefines, isobutylene, tri-methylethylene, unsymmetrical methylethylethylene, and other unsaturated bodies having a very high reactive affinity for combining acids or other reactants, and including the amylenes, for example pentene-1 and pentene-2.

The process of the present invention is particularly useful for the recovery of alcohols from any hydrocarbon mixture containing olefines, and especially useful when the mixture treated contains butylenes, amylenes, and hexylenes as major constituents. Practice of the invention results in certain new compositions of matter, herein claimed.

A preferred mode of preparation of the preferred material for treatment according to this invention is descibed in the application for Letters Patent by Earl P. Stevenson and Clarence K. Reiman, filed February 13, 1925, Serial No. 8907, and the process herein described and claimed may be practiced instead of a part of, or as a supplementary treatment in addition to the process for treating this material described and claimed in the application for Letters Patent of Harold S. Davis and Wallace J. Murray, Serial No. 10,992, filed February 24, 1925, and bearing Patent No. 1,790,517.

As described in said application Serial No. 8907, a natural hydrocarbon material having been subjected to a regulated vapor phase cracking suitable for the production of olefine-bearing gases, the gaseous and vaporous efflux is then subjected to fractionation by condensation, or distillation, or both, whereby the light normally condensible or liquid hydrocarbons, including amylenes and hexylenes, are segregated into one fraction, preferably with a distillation end-point of 60° C.; or higher, if hexyl, heptyl or other alcohols of higher molecular weight are to be made. In this fraction, hereinafter mentioned for convenience as an amylene fraction, may also be absorbed the butylenes, of which there are three,

|  | Boiling point |
|---|---|
| Isobutene | −6° C. |
| Butene-2 | 1° C. |
| Butene-1 | −5° C. | or the butylene contents may be segregated and separately treated for the recovery of butyl alcohols.

While a principal industrial value of the present process lies in the facility afforded by it for the treatment of the mixed amylene and butylene fraction referred to for the recovery of amyl, butyl and hexyl or higher alcohols, I am not to be understood as restricting the invention claimed to treatment of this particular mixture, since this invention comprises a series of steps primarily useful for the recovery of tertiary alcohols from mixtures resulting from the heat treatment of hydrocarbons, or otherwise formed, when the said mixtures contain series of olefine materials capable of conversion into alcohols. Objects of the invention include the provision of steps suitable to the treatment of the said materials, or any of them severally, to obtain alcoholic derivatives.

An object of the invention is thus the manufacture of alcohols from the simpler liquid olefines of four to seven carbon atoms inclusive, including the alcohols derived from the butylenes, amylenes, hexylenes and heptylenes.

An object of the invention is also the maximum economic utilization of all of the olefines present in light hydrocarbon mixtures; and also to prepare the resulting olefine derivatives or reaction products in such a manner that their purification or refining to meet the usual commercial requirements may readily be carried out in a practical way.

The preferred light normally liquid hydrocarbon material to be treated, as referred to above, is characteristically composed almost wholly of unsaturated hydrocarbons which conveniently may be classified in three principal groups according to their chemical reactivity toward acid, preferably sulfuric acid, and the kind of products derivable therefrom as:

(1) Dienes (diolefines) such as butadiene and isoprene;

(2) Iso-olefines which yield tertiary derivatives;

(3) Olefines both iso- and normal which yield secondary derivatives.

When the original raw material for the vapor phase cracking is a material of the petroleum gas oil range, with or without lighter constituents, and when the cracking comprises maintaining its vapors at a constant temperature of the order of 600° C. for a substantial time, the vapors stripped of condensible liquid at and above 60° C. at normal pressures contain substantial quantities of the said groups of unsaturated hydrocarbons. Other gaseous products of the cracking reaction are not substantially absorbed in the amylene fraction obtained by oil absorption or cold condensation, or both, of the residual vapors, nor in the butylenes made liquid by slight pressure or refrigeration, or both; and it will therefore be understood that the preferred material segregated for the treatment to be described is substantially stripped of propylene, ethylene and other gases resulting from the heat treatment. But the presence, accidental or intentional, of other olefines, propylene and ethylene, or other more inert gases, is not detrimental to this process. The relative amounts of the individual components may vary in this unsaturated hydrocarbon mixture without necessarily involving any desirable change in the sequence of steps herein recommended. For example, beginning with the preferred vapor phase cracking process as a point of origin, it is optional whether the butylenes are caused to be absorbed entirely into the amylene fraction (which necessitates treatment under slight pressure) or whether a fraction containing only a part of the butylenes resulting from pyrogenesis is subjected to treatment. It is not necessary to advantageous practice that the fraction treated shall contain no hydrocarbons above the hexylenes in molecular weight, though I prefer to work with a fraction which is entirely distillable in the range up to and including any olefines whose alcoholic derivatives are desired to be produced; in certain cases where alcohols above hexyl are desired, a wider range of hydrocarbons may be treated. Mixtures containing other substances than the mentioned groups may advantageously be treated when sufficiently rich in the materials of said groups, or any of them.

A salient characteristic of this invention is the selective treatment of the material in relation to the three groups of unsaturated hydrocarbons mentioned above in such a way as to cause tertiary and secondary alcohols to be separately recovered with a minimum of acid consumption.

I have discovered that the iso-olefines which yield tertiary alcohols are capable of being selectively converted and the alcohol recovered with a minimum of acid consumption. I have discovered that those iso-olefines which yield tertiary alcohols, hereinafter referred to as tertiary base olefines, can be completely and selectively separated from the secondary base olefines with direct conversion into tertiary alcohols by the use of acid, preferably sulfuric, under carefully regulated conditions, and this step exemplifies the first stage of this process.

In practice I have found that the selective conversion into alcohols of the tertiary base olefines can effectively be achieved by the use of sulfuric acid of a concentration at or near 60% at normal temperature, though I prefer to use 65% acid, which is more reactive and accomplishes the desired conversion in a shorter time. In general it may be stated that I find acid of not exceeding 70% $H_2SO_4$ content, suitable for this purpose.

In the second stage of the process hereinafter briefly described, secondary alcohols are produced by reacting on the hydrocarbon material, residual from the first stage, under different conditions and preferably with stronger acids. As a step between these two stages, it may sometimes be found desirable and advantageous to rectify the hydrocarbon mixture to separate therefrom the polymers produced in the first stage, and also to separate and recover any tertiary alcohols which may be preferentially dissolved in the hydrocarbon residues as an incident of the conversion of the tertiary base olefines and as a consequence of their limited solubility in the dilute acid used in the first stage and their solubility in the unchanged hydrocarbons of the said polymers.

The strength of acid best adapted to react with the secondary base olefines depends upon the conditions of temperature, the presence of hydrocarbon diluents, and somewhat upon the proportions of the individual olefines comprising the mixture. In general, it is found desirable successively to treat with portions of acids, which may be of different concentrations, with intermediate separation of the acid products, as by settling and decantation. In my usual practice, I first treat with 77% acid in two successive portions, with intermediate separation, and then complete the reaction on the secondary base olefines with acid of a higher concentration.

Contrary to the prevailing conceptions in the art, which have been inherited from laboratory investigations of the reactions between olefines and sulfuric acid, I have discovered that it is not essential to maintain temperatures below 30° C. in the second stage of this process, and, in fact, that it is undesirable to do so. More complete recoveries of secondary alcohols can be realized by allowing the temperatures to rise at this stage above 30° C.; in practice I prefer and recommend carrying on the acid treatment at temperatures above 35° C. and below 45° C. The temperature may be allowed to rise still further in some cases.

But I advocate and recommend reaction on materials maintained in the liquid state, and therefore recommend reaction under conditions of suitable pressure, especially when the temperature is relatively high. Carrying out the acid reaction under light pressure contributes to the efficiency of conversion to alcohols; this is attributable to avoidance of any gaseous development of one or more of the reacting substances.

The invention will now be described in relation to a typical instance of practice upon raw material comprising butylenes, amylenes and hexylenes in admixture with diolefines and other hydrocarbons, such as the so-called amylene fraction mentioned above and in the said application Serial No. 10,992; but the treatment to be described is suitable substantially without change for the normally condensible products of any cracking process when carried out upon the fraction distilling up to 60° C., with or without all of the butylene which can be condensed in this fraction by compression. The process will be described in connection with apparatus shown diagrammatically in the accompanying drawings, in which:

Figure 1:
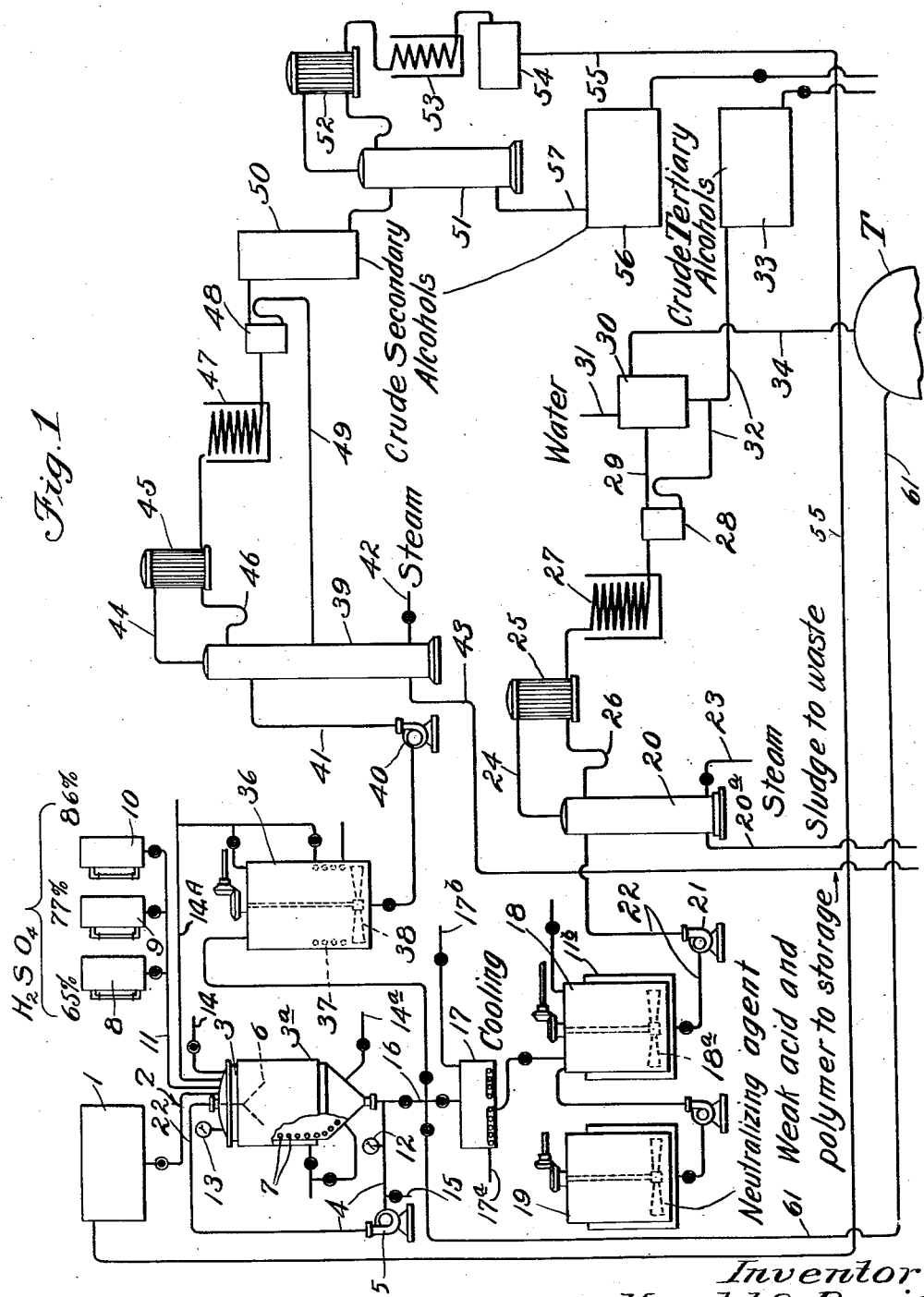
Fig. 1 is a diagram and flow sheet in elevation.

Referring now to Fig. 1, hydrocarbon material to be treated stored in a tank 1 is delivered in measured quantity through the pipe 2 into a treatment vessel 3, provided with agitating means such as the circulation pipe 4, pump 5 and spray pipe 6. Treater 3 is provided with a heating or cooling coil 7 for water, brine or steam circulation, may be suitably jacketed at 3ª for heating, and should be capable of withstanding considerable pressures.

The material is now subjected to a first treatment for conversion of the tertiary base contents into tertiary alcohols. To an initial charge of 100 volumes of hydrocarbon material for a specific instance of treatment of a typical amylene fraction in treater 3, 8.3 volumes of 65% sulfuric acid, for example, may be added from an acid tank 8 of a series of acid tanks 8, 9, 10, suitably communicating with treater 3 by valved connections to a pipe 11, at a rate which, according to temperatures as shown by the thermometer at 12, preferably does not result in a rise of temperature beyond 20° C. During the first period of this operation a slight temperature rise is practically unavoidable, and in case the charge is under pressure at the start, as in the instance where all or a considerable part of the available butylenes are present, a marked rise of pressure may take place, to indicate which a gauge 13 may be provided. In such instances it may be found alvisable to open a valved vent pipe 14 at the top of the treater leading to a gasometer, or a compressor and pressure tank, not shown, in which the butylene gas evolved as a consequence of rising temperature is stored, this gas being returned to the treater through pipe 14ª at a later period, as during treatment with a second charge of 65% acid mentioned below.

The time of the first treatment with sulfuric acid may vary with the material undergoing treatment and the degree in which agitation in treater 3 mixes the material and the acid, but usually the treatment is complete within a period of one and a half to two and a half hours, as may be ascertained by taking samples at fifteen-minute intervals from a tap 15, and determining the specific gravity of the settled acid layer. When the gravity of the acid product falls to a substantially constant figure, the treatment is stopped; continuing beyond this point results in a lower recovery of tertiary alcohols. This is a general rule for all acid treatments as hereinafter specified.

In the specific example relied upon as a typical instance throughout this description, the first treatment was completed in 90 minutes, and yielded, after stopping the circulaing pump and allowing the mixture to settle for fifteen minutes to stratify the acid product and hydrocarbon material, seventeen volumes of acid product, specific gravity 1.17. It will be understood that continuous testing may be dispensed with when the material, temperatures, pressures and acid concentrations are standardized, reliance upon control of the time then producing the desired results.

The acid product only of this first or tertiary-recovery treatment, which product readily separates from the unchanged hydrocarbon and polymer by gravity, is drawn off from the bottom of treater 3 through a pipe 16 into a storage tank 17, which may be provided with a cooling fluid circulation coil 17ª, and thence, without delay during which the somewhat unstable acid product might deteriorate, passes into a neutralizer 18, which may be any suitable tank provided with agitating means 18ª, and which previously has been charged with milk-of-lime from a slaking tank 19 in amount predetermined by the acid content of the acid product batch in 17. Instead of milk-of-lime other alkalies may be used. It is desirable to equip the neutralizer 18 with a water jacket 11$^b$ or with cooling coils, not shown, or otherwise to maintain in it a temperature below 35° C.; for example by admitting diluent very cold water by pipe 17$^b$. The tank 18 may be vented to a condenser, not shown, in order to save any tertiary alcohols that may be distilled over in consequence of a temperature rise attending neutralization.

In case the tertiary product is mainly or principally a butylene derivative, or when the recovery of tertiary amyl alcohol is not desired, the neutralization step may be dispensed with and distillation effected from the diluted acid product.

Immediately following the discharge of the first lot of acid product from treater 3, a similar series of operations on the residual hydrocarbons is carried out, using a second and usually an equal quantity of the same acid, (e. g. 65% acid from tank 8 in the described instance). In the specific example, the second treat with 8.3 volumes of 65% acid yielded 10 volumes of acid product. This acid product is also drawn off into tank 17 and neutralizing tank 18 and neutralized with lime or an alkali. The neutralized product is now distilled.

The stirrer 18$^a$ is kept in operation while the acid product from 17 is run into tank 18, and while feeding a fractionating column 20, preferably of the bubble plate type, through feed pump 21 and line 22. The column 20 is operated as a steam still by injecting steam at 23. The vapors of mixed tertiary alcohols pass overhead through line 24 to dephlegmator or reflux condenser 25, which can be so regulated as to maintain any desired reflux ratio, returning its condensate through reflux leg 26 to the top plate of tower 20. The acid sludge or neutralization product may flow off from the bottom of tower 20 at 20$^a$. From condenser 25 the uncondensed vapors pass to condenser 27 discharging into separator 28, where two layers appear, a hydrocarbon layer, comprising unchanged hydrocarbons extracted by the acid, polymers and alcohols; and a water layer which contains substantially all of the tertiary butyl alcohol.

The hydrocarbon layer is drawn off through 29 into washer 30, of any design appropriate to effect intimate contact between water and the alcoholic content of liquids received, and to permit stratification under gravity. In this washer the alcohol content is extracted with water injected at 31. The water-alcohol layer from 30 is discharged continuously through line 32, joining the water-alcohol stream from the separator 28 and passing on to storage 33; and the hydrocarbon layer, now substantially alcohol-free, is run off through pipe 34 to the storage tank T, also shown in Fig. 2.

In one aspect of this invention the first stage of treatment above described is valuable in a subtractive sense as a step for the selective removal from the mixture treated of the highly reactive unsaturated substances, including the tertiary base substances, leaving the secondary base substances in an optimum state for reaction to valuable derivatives of these secondary base substances. In this aspect the particular steps performed for the selective removal of the tertiary base substances and the detrimental highly reactive substances are not essential to the process, and any competent treatment for the removal of the tertiary base materials may be substituted within this invention.

For example, the tertiary base substances may be separately removed by reaction with sulfur dioxide ($SO_2$), and the tertiary base products reacted upon with the effect of removing them. For another example, where the production of the tertiary alcohols with the aid of sulfuric acid is not desired, the first stage of this process may with advantage be practised by the conversion of the tertiary base olefines into chlorides by reaction with concentrated hydrochloric acid, with subsequent extraction of the reaction products with water, resulting in the direct hydrolysis of the tertiary chlorides and their separation as dilute solution of alcohols. In the broader aspects of my invention it is immaterial whether the hydrolysis of the acid reaction product of the tertiary base olefines or the acid reaction product of the secondary base olefines with the olefines of tertiary base structure to form tertiary alcohols be achieved by dilution as in the hydrochloric acid treatment, or by neutralization with alkali and resultant dilution in the sulfuric acid treatment. Under either method a certain amount of hydrolysis of the tertiary base olefines takes place during the acid treatment without otherwise causing it by dilution or neutralization. Following the hydrochlorination or other removal step, the remaining hydrocarbons may be treated according to the second stage of the present invention about to be described to prepare therefrom secondary alcohols.

The hydrocarbon residual material may now be treated to form the acid absorption products of the secondary-base-structure olefines.

Returning now to the charge remaining in the treater 3, it is optional whether this shall be distilled to separate from the secondary base olefines any alcohols extracted from the acid product in the two preceding treatments with acid, and to separate polymers formed from the diolefines; or shall be subjected directly to the second stage of the process for recovery of secondary alcohols. In this secondary stage successive extractions with acid of one concentration may be resorted to, but it is preferred to employ two concentrations; the number of treatments severally for absorption of the secondary-base-structure olefines depends upon the material treated and the result desired. Satisfactory results are obtained in the instance of the preferred material, heretofore referred to, by treatments, severally, with two successive portions of sulfuric acid of 77% concentration, followed by one treatment with sulfuric acid of 86% concentration; but acid diluted to 70% may be used in the first treatment and acid as strong as 95% in the last treatment, if some losses of ultimate alcohol may be tolerated.

On the unit basis of 100 volumes of hydrocarbons at the start of stage one, the first extraction in stage two may be made with thirteen volumes of 77% acid fed to the treater from acid tank 9 through pipe 11. The acid may be added over a period of fifteen minutes with circulating pump 5 in action from the start. The temperature recorded at 12 should be between 35 and 40° C.; if necessary to attain this temperature, steam may be admitted into coils 7 or jacket 3ª, or both. The treatment is continued until acid product settled from samples taken at 15 shows a minimum specific gravity; for example 1.29 in the specific instance. At the end of the treatment the circulating pump is shut off, the mixture allowed to stratify into two distinct layers, and the acid product discharged from the bottom of treater 3 into a dilution tank 36 partly filled with water and fitted with cooling fluid circulation coils 37 and stirrer 38, which is operated during the dilution period. Instead of allowing the material to stratify in treater 3, it may, within the invention, be run off into a suitable centrifugal separator, not shown, with some advantage in the completeness of separation and in the time required for separation. The hydrocarbon, in this case, is returned to treater 3, and the acid product delivered into dilution tank 36.

The degree to which the acid product must be diluted to substantially avoid reversion to secondary base olefines and formation of derivatives of the alcohols, such as ethers, may have a limit as high as a 30% acid concentration when the distillation about to be described, is conducted at substantially atmospheric pressure, but I prefer to dilute to an acid concentration of 25%. In vacuo-distillation, lower degrees of dilution are permissible, the exact degree depending upon the vacuum employed; and, if distilled under pressure, higher dilutions should be used. Having treated with acid and run off the acid absorption product, the next of the several acid treatments referred to may be carried out in the same way on the residual hydrocarbon separate left in treater 3.

In practice upon the preferred material above mentioned the treatment comprises agitation with a second portion of 13 volumes of 77% acid, and to follow this a treatment with 10 volumes of 86% acid run in from acid tank 10. The acid and aqueous separate, on settling as before, is diluted in tank 36 to convert the acid absorption product not already hydrolyzed into the secondary alcohols and to avoid spontaneous reversion to their bases or derivatives.

The dilution products are fed severally as they are made (with intervening mixture together, if desired) into a steam still 39, which may be of the bubble plate type. It is satisfactory to pump the dilution products severally through pipe 41 by a pump 40 into the still 39, to which steam is admitted at the bottom through connection 42, and from which exhausted dilute acid is drawn off through pipe 43 into storage, from which it may be drawn to a concentrating unit, not shown, and brought into condition for re-use. From the top plate of the column still 39, the vapors pass through pipe 44 to a reflux condenser 45, which can be regulated to maintain any desired reflux ratio, returning to the top plate through reflux leg 46. The uncondensed vapors are condensed at 47 and separated at 48, the water-alcohol layer being returned to an intermediate plate in tower 39 through a pipe line 49. The hydrocarbon-alcohol layer, which may include some unchanged hydrocarbon in the boiling range of the material in feed tank 1 and sundry polymers, is collected in tank 50. This crude product is now to be refined.

As a first step in refining the crude alcohols collected at 50, the crude mixture may be fractionated in a column 51, dephlegmator 52, and condenser 53, to separate the light hydrocarbons and return them through storage 54 and line 55 to hydrocarbon storage at 1. The mixed alcohol and heavy-hydrocarbon fraction is taken off at the bottom of column 51 through pipe 57 to a collection tank 56, and is now ready for refining.

The residual hydrocarbons remaining in treater 3 may now be washed with water and residual traces of acid neutralized with caustic soda, and then distilled to separate therefrom the unchanged fraction, for example boiling up to an initial point at 60° C. This residue contains material, including high boiling polymers, distilling between 60° and 225° C., which is a valuable motor fuel, and may be collected for this use.

Figure 2:
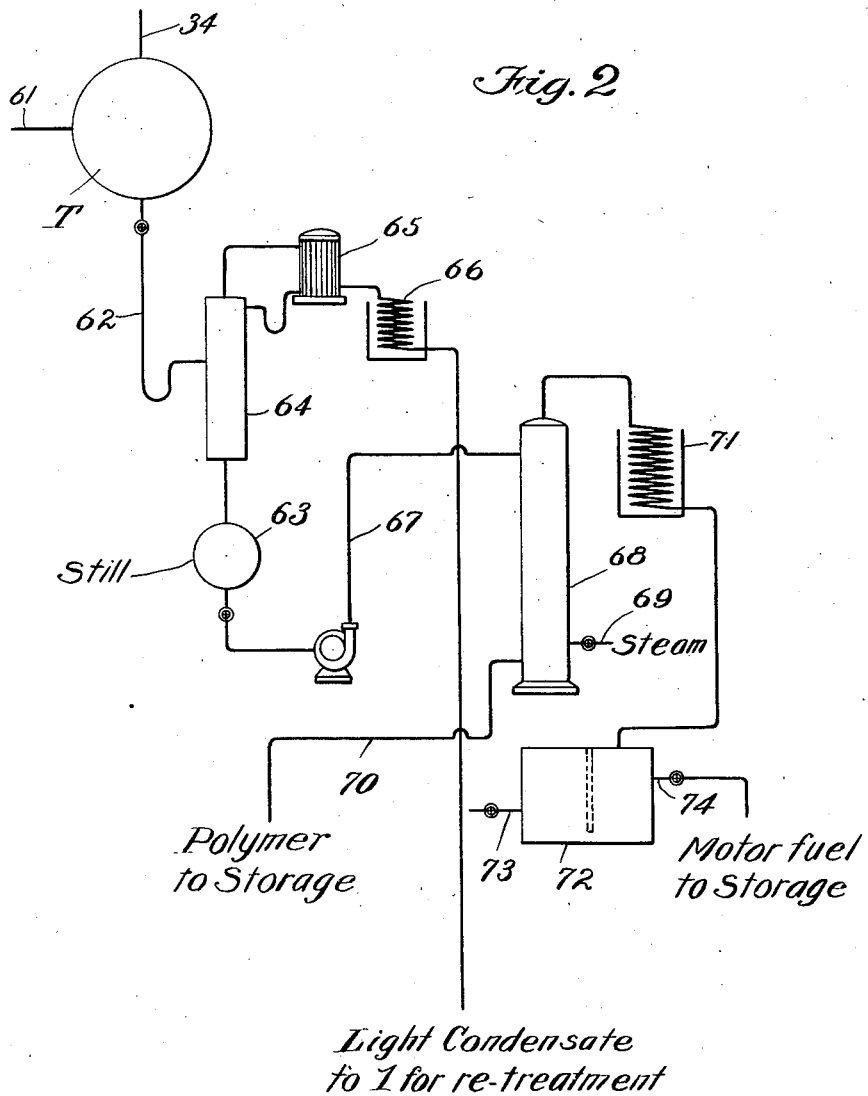
Fig. 2 is a similar diagram illustrating further treatment.

The residual unaltered hydrocarbons and polymers, referring now to Fig. 2, which have been collected in the tank T may be subjected to a fractionating treatment for the purpose of separating the fraction distilling to an end-point of 60° C., for re-treatment, preparing a fraction having a boiling point range of from 60° C. to 225° C. for motor fuel use, and collecting the volatile polymer boiling above 225° for use as flotation oils, a source of synthetic gums, and other useful products. The neutralized residue from the treater 3 may be delivered to the storage tank T through pipe 61, and the combined hydrocarbon residues there collected may be delivered through pipe 62 into a refining still 63 fitted with a fractionating column 64, dephlegmator 65 and condenser 66. The temperature at the top of the column 64 is regulated for the desired end-point of the overhead fraction, in this case 60° C. This fraction may be returned to feed tank 1. The bottoms which collect in still 63 may be pumped through line 67 into column 68, into which steam is injected at the base through inlet 69. By regulating the amount and temperature of the steam with reference to the rate of feed through pipe 67, the desired end-point for the overhead fraction from column 68 can be maintained. The run-back from the column 68 through pipe 70 is composed of heavy polymers. The steam and hydrocarbon from the top of the column are condensed at 71 and collected in a separation tank 72 from which water and the hydrocarbon substances suitable for motor fuel may be drawn off respectively at 73 and 74.

As a result of the foregoing operations any crude tertiary alcohols are recovered substantially unmixed with secondary alcohols, and conversely the crude secondary alcohols are substantially free from tertiary alcohols. The process is highly advantageous in respect to the comparative volumes of alcohols recovered from the olefine material, and in respect to the requisite consumption of acid relatively to the quantitative recovery of alcohols. In the specific instance described, when the process was carried out upon the 100 volumes of mixed hydrocarbons, 64.5% of this material distilled below 60° C. and upon treatment there were recovered as alcohols 5.2 volumes of tertiaries; in terms of relative volume of the fraction boiling at 60° C. end-point, these recoveries constituted 8% in the form of crude tertiary alcohols.

These recoveries necessitate the use of 2.5 volumes or less of concentrated sulfuric acid to each volume of crude concentrated anhydrous alcohols. In practice, an acid-alcohol ratio by weight of three parts of 95% acid to one part of anhydrous alcohol is of normal attainment when operating on the preferred material.

The crude tertiary and crude secondary alcohols thus separately produced may now be severally treated to separate them according to their base olefines. Preferred specific treatments for this purpose, which are no part of the present invention are facilitated by the state to which the present process reduces the said mixed crude tertiary and mixed crude secondary alcohols. The tertiary alcohols are recovered free from hydrocarbons by reason of the water extraction at 30 (Fig. 1) and can readily be separated into tertiary amyl and tertiary butyl alcohol (tri-methyl carbinol), when anhydrous, by fractional distillation. The procedure, in brief, involves dehydration of the mixture by caustic or other reagents, and careful fractional distillation.

Refinement for the separation of the secondary alcohols collected at 56 (Fig. 1) may comprise drying the mixture with flake caustic, and then distilling, cutting and disposing of the fraction as follows:

60°– 90° C.—Mixed material; dry, and rerun with succeeding lot of crude alcohol.
90°–100° —Crude secondary butyls.
110°–125° —Crude secondary amyls.
125°–150° —Crude secondary hexyls.
Residue —Hydrocarbons; returned to T, Fig. 2.

The resulting crude separates of butyl, amyl, hexyl and heptyl alcohols may be refractionated, as will be obvious to those skilled in the art of rectifying alcohols, and otherwise treated to obtain alcohols of any desired degree of refinement. Preferred and recommended refinement treatments, which may be greatly varied, are no part of the present invention. I do not herein claim the matters claimed in my application Serial No. 43,208 filed July 13, 1925, Patent No. 1,790,518, of which this application is a division.

I claim:

1. Process for preparing tertiary amyl and butyl alcohols from a mixture containing isobutene, tri-methylethylene and unsymmetrical methylethylethylene comprising reacting thereon with cold sulfuric acid of about 60 to 65 per centum strength and recovering tertiary alcohol from the reaction product.

2. The process for preparing tertiary amyl and butyl alcohols from a mixture containing isobutene, tri-methylethylene and unsymmetrical methylethylethylene comprising maintaining the materials in a liquid state under pressure, reacting thereon with cold dilute sulfuric acid of a concentration not in excess of seventy per centum, separating the acid reaction product, neutralizing the same, and recovering the tertiary alcohols by distillation therefrom.

3. In the process of generating tertiary alcohols of from 4 to 6 carbon atoms to the molecule from a mixture of hydrocarbons derived from the pyrolysis of petroleum oil and containing olefines, said olefines consisting predominantly of secondary and tertiary olefines of not exceeding 6 carbon atoms to the molecule, the step of selectively sulphating the tertiary olefines contained in said mixture by admixing said mixture with aqueous sulphuric acid while maintaining an acid concentration and a temperature below that at which substantial proportions of the secondary olefines are sulphated.

4. Process according to claim 3, in which the selective sulphation of the tertiary olefines is accomplished by contacting said mixture with aqueous sulphuric acid of not exceeding 70%, $H_2SO_4$ content, while maintaining a temperature below that at which substantial proportions of the secondary olefines are sulphated.

5. Process according to claim 3, in which the selective sulphation of the said tertiary olefines is accomplished by contacting said mixture with aqueous sulphuric acid of not exceeding 65%, $H_2SO_4$ content, at temperatures not exceeding 20° C.

6. In the process of generating tertiary alcohols of from 4 to 6 carbon atoms to the molecule from a mixture of hydrocarbons derived from the pyrolysis of petroleum oil and containing secondary and tertiary olefines, the steps of separating from said mixture by distillation a fraction, the olefine content of which consists predominantly of secondary and tertiary olefines of from 4 to 6 carbon atoms to the molecule, and selectively sulphating the tertiary olefines contained in said fraction by admixing said fraction with aqueous sulphuric acid while maintaining an acid concentration and a temperature below that at which substantial proportions of the secondary olefines are sulphated.

7. Process according to claim 6, in which the selective sulphation of tertiary olefines is accomplished by contacting said mixture with aqueous sulphuric acid of not exceeding 70%, $H_2SO_4$ content, while maintaining a temperature below that at which substantial proportions of the secondary olefines are sulphated.

8. Process according to claim 6, in which the selective sulphation of said tertiary olefines is accomplished by contacting said mixture with aqueous sulphuric acid of not exceeding 65%, $H_2SO_4$ content, at temperatures not exceeding 20° C.

Signed by me at Boston, Massachusetts, this twenty-third day of February, 1927.

HAROLD S. DAVIS.